US009312699B2

(12) United States Patent
Taimela et al.

(10) Patent No.: US 9,312,699 B2
(45) Date of Patent: Apr. 12, 2016

(54) ISLAND GRID POWER SUPPLY APPARATUS AND METHODS USING ENERGY STORAGE FOR TRANSIENT STABILIZATION

(71) Applicant: Earl Energy, LLC, Virginia Beach, VA (US)

(72) Inventors: Pasi Taimela, Wake Forest, NC (US); Tony Olivo, Raleigh, NC (US); Robert William Johnson, Jr., Raleigh, NC (US); Doug Moorehead, Virginia Beach, VA (US)

(73) Assignee: Flexgen Power Systems, Inc., Houston, TX (US)

( * ) Notice: Subject to any disclaimer, the term of this patent is extended or adjusted under 35 U.S.C. 154(b) by 435 days.

(21) Appl. No.: 13/875,603

(22) Filed: May 2, 2013

(65) Prior Publication Data
US 2014/0103727 A1 Apr. 17, 2014

Related U.S. Application Data

(60) Provisional application No. 61/712,533, filed on Oct. 11, 2012, provisional application No. 61/771,417, filed on Mar. 1, 2013.

(51) Int. Cl.
*H02J 1/00* (2006.01)
*H02J 3/46* (2006.01)
*H02J 3/24* (2006.01)
*H02J 3/28* (2006.01)
(Continued)

(52) U.S. Cl.
CPC ... *H02J 3/46* (2013.01); *H02J 3/24* (2013.01); *H02J 3/28* (2013.01); *H02J 3/381* (2013.01); *H02J 3/30* (2013.01); *H02J 3/32* (2013.01); *Y10T 307/68* (2015.04); *Y10T 307/707* (2015.04)

(58) Field of Classification Search
CPC ............. H02J 3/24; H02J 3/28; Y10T 307/68
USPC .......................................................... 307/76
See application file for complete search history.

(56) References Cited

U.S. PATENT DOCUMENTS 4,992,920 A 2/1991 Davis
5,563,802 A 10/1996 Plahn et al.
(Continued)

FOREIGN PATENT DOCUMENTS

DE 69 707 704 D1 11/2001
DE 69 707 704 T2 6/2002
(Continued)

*Primary Examiner* — Jared Fureman
*Assistant Examiner* — Duc M Pham
(74) *Attorney, Agent, or Firm* — Myers Bigel & Sibley, P.A.

(57) ABSTRACT

A system includes at least one generator coupled to an island grid, at least one energy storage unit and at least one converter coupled to the at least one energy storage unit and configured to be coupled to the island grid. The system further includes a control circuit configured to cause the at least one converter to transfer power between the at least one energy storage unit and the grid responsive to a change in a load on the island grid to maintain operation of the at least one generator at a predetermined operating point. The at least one generator may include a control system configured to match generator output to the load and the control circuit may be configured to maintain the control system of the at least one generator within a predetermined dynamic response capability limit responsive to the change in the load.

15 Claims, 13 Drawing Sheets

(51) Int. Cl.
  *H02J 3/38* (2006.01)
  *H02J 3/30* (2006.01)
  *H02J 3/32* (2006.01)

(56) References Cited

U.S. PATENT DOCUMENTS

| | | | |
|---|---|---|---|
| 5,907,192 A | 5/1999 | Lyons et al. |
| 5,929,538 A | 7/1999 | O'Sullivan et al. |
| 6,038,118 A | 3/2000 | Guerra |
| 6,128,204 A | 10/2000 | Munro et al. |
| 6,175,217 B1 | 1/2001 | Da Ponte et al. |
| 6,252,753 B1 | 6/2001 | Bhargava |
| 6,870,279 B2 | 3/2005 | Gilbreth et al. |
| 6,879,053 B1 | 4/2005 | Welches et al. |
| 6,958,550 B2 | 10/2005 | Gilbreth et al. |
| 6,969,922 B2 | 11/2005 | Welches et al. |
| 7,002,260 B2 | 2/2006 | Stahlkopf |
| 7,116,010 B2 | 10/2006 | Lasseter et al. |
| 7,184,903 B1 | 2/2007 | Williams et al. |
| 7,391,126 B2 | 6/2008 | Liu et al. |
| 7,474,016 B2 | 1/2009 | Wang et al. |
| 7,476,987 B2 | 1/2009 | Chang |
| 7,514,808 B2 | 4/2009 | Wobben |
| 7,560,906 B2 | 7/2009 | Liu et al. |
| 7,612,466 B2 | 11/2009 | Skutt |
| 7,675,187 B2 | 3/2010 | Woods et al. |
| 7,680,562 B2 | 3/2010 | Delmerico et al. |
| 7,701,087 B2 | 4/2010 | Eckroad et al. |
| 7,781,902 B2 | 8/2010 | Cerney et al. |
| 7,787,272 B2 | 8/2010 | Lasseter et al. |
| 7,834,479 B2 | 11/2010 | Capp et al. |
| 7,855,467 B2 | 12/2010 | Kawazoe et al. |
| 7,906,862 B2 | 3/2011 | Donnelly et al. |
| 7,969,030 B2 | 6/2011 | Woods et al. |
| 8,022,572 B2 | 9/2011 | Vyas et al. |
| 8,080,898 B2 | 12/2011 | Fukuhara |
| 8,099,198 B2 | 1/2012 | Gurin |
| 8,164,217 B1 | 4/2012 | Miller |
| 8,222,756 B2 | 7/2012 | Koeneman et al. |
| 8,227,929 B2 * | 7/2012 | Burra et al. ............ 290/44 |
| 8,315,745 B2 | 11/2012 | Creed |
| 8,338,987 B2 | 12/2012 | O'Brien et al. |
| 8,452,688 B1 | 5/2013 | Sharplin et al. |
| 8,492,913 B2 | 7/2013 | Koeneman et al. |
| 8,532,834 B2 | 9/2013 | Delong et al. |
| 8,558,510 B2 | 10/2013 | Moon |
| 8,688,281 B2 | 4/2014 | Viassolo et al. |
| 8,751,036 B2 | 6/2014 | Darden, II et al. |
| 8,766,474 B2 | 7/2014 | Carralero et al. |
| 8,810,066 B2 | 8/2014 | Moon |
| 8,829,698 B2 | 9/2014 | Koeneman et al. |
| 8,831,788 B2 | 9/2014 | Flynn et al. |
| 8,849,469 B2 | 9/2014 | Belady et al. |
| 8,866,334 B2 | 10/2014 | Donnelly et al. |
| 8,922,056 B2 | 12/2014 | Thisted |
| 8,922,062 B2 | 12/2014 | Johnson et al. |
| 8,938,323 B2 | 1/2015 | Lee |
| 8,946,916 B2 | 2/2015 | Tarnowski |
| 8,946,929 B2 | 2/2015 | Singh et al. |
| 8,975,767 B2 | 3/2015 | Algrain |
| 9,026,259 B2 | 5/2015 | Zadeh et al. |
| 9,026,260 B1 | 5/2015 | Thornley et al. |
| 9,042,141 B2 | 5/2015 | Yu et al. |
| 2002/0190525 A1 | 12/2002 | Worden et al. |
| 2002/0198648 A1 | 12/2002 | Gilbreth et al. |
| 2003/0047209 A1 | 3/2003 | Yanai et al. |
| 2004/0051387 A1 | 3/2004 | Lasseter et al. |
| 2004/0084965 A1 | 5/2004 | Welches et al. |
| 2004/0245783 A1 | 12/2004 | Gilbreth et al. |
| 2005/0012395 A1 | 1/2005 | Eckroad et al. |
| 2005/0154499 A1 | 7/2005 | Aldridge et al. |
| 2005/0200133 A1 | 9/2005 | Wobben |
| 2007/0182158 A1 | 8/2007 | Cerney et al. |
| 2007/0228836 A1 | 10/2007 | Teichmann |
| 2007/0267871 A1 | 11/2007 | Gregory |
| 2008/0088183 A1 | 4/2008 | Eckroad et al. |
| 2008/0203734 A1 | 8/2008 | Grimes et al. |
| 2008/0211230 A1 | 9/2008 | Gurin |
| 2008/0278000 A1 | 11/2008 | Capp et al. |
| 2009/0086520 A1 | 4/2009 | Nishimura |
| 2009/0140576 A1 | 6/2009 | Yu et al. |
| 2009/0189456 A1 | 7/2009 | Skutt |
| 2009/0195074 A1 | 8/2009 | Buiel |
| 2009/0312885 A1 | 12/2009 | Buiel |
| 2010/0008119 A1 | 1/2010 | O'Brien et al. |
| 2010/0096918 A1 * | 4/2010 | Sawada et al. ............ 307/9.1 |
| 2010/0138066 A1 | 6/2010 | Kong |
| 2010/0264739 A1 | 10/2010 | Errington |
| 2010/0270864 A1 | 10/2010 | Vyas et al. |
| 2010/0292853 A1 * | 11/2010 | McDonnell ............ 700/287 |
| 2010/0327800 A1 | 12/2010 | Reineccius |
| 2011/0060474 A1 | 3/2011 | Schmiegel et al. |
| 2011/0062708 A1 | 3/2011 | Prochaska et al. |
| 2011/0068631 A1 | 3/2011 | Roscoe |
| 2011/0080044 A1 | 4/2011 | Schmiegel |
| 2011/0115295 A1 | 5/2011 | Moon et al. |
| 2011/0118894 A1 | 5/2011 | Reineccius et al. |
| 2011/0133558 A1 | 6/2011 | Park |
| 2011/0140520 A1 | 6/2011 | Lee |
| 2011/0140648 A1 | 6/2011 | Lee |
| 2011/0144822 A1 | 6/2011 | Choi |
| 2011/0148195 A1 | 6/2011 | Lee |
| 2011/0148360 A1 | 6/2011 | Lee |
| 2011/0204720 A1 | 8/2011 | Ruiz |
| 2011/0248569 A1 | 10/2011 | Son et al. |
| 2011/0260546 A1 | 10/2011 | Hashizume et al. |
| 2011/0273022 A1 | 11/2011 | Dennis et al. |
| 2011/0309690 A1 | 12/2011 | West |
| 2012/0029897 A1 | 2/2012 | Cherian et al. |
| 2012/0033473 A1 | 2/2012 | Scharf |
| 2012/0046798 A1 | 2/2012 | Orthlieb et al. |
| 2012/0068540 A1 | 3/2012 | Luo et al. |
| 2012/0080942 A1 | 4/2012 | Carralero et al. |
| 2012/0083927 A1 * | 4/2012 | Nakamura et al. ............ 700/278 |
| 2012/0089261 A1 | 4/2012 | Kim |
| 2012/0143383 A1 | 6/2012 | Cooperrider et al. |
| 2012/0146412 A1 | 6/2012 | Harrison |
| 2012/0146423 A1 | 6/2012 | Bodewes et al. |
| 2012/0147637 A1 | 6/2012 | Petter |
| 2012/0166013 A1 | 6/2012 | Park et al. |
| 2012/0215368 A1 | 8/2012 | Sharma |
| 2012/0239215 A1 | 9/2012 | Timbus et al. |
| 2012/0267952 A1 | 10/2012 | Ballatine et al. |
| 2012/0283887 A1 | 11/2012 | Goldsmith et al. |
| 2012/0283890 A1 | 11/2012 | Fu et al. |
| 2012/0292992 A1 | 11/2012 | Williams |
| 2012/0323396 A1 | 12/2012 | Shelton et al. |
| 2013/0015703 A1 | 1/2013 | Rouse et al. |
| 2013/0035802 A1 | 2/2013 | Khaitan et al. |
| 2013/0041516 A1 | 2/2013 | Rockenfeller et al. |
| 2013/0088084 A1 | 4/2013 | Szu |
| 2013/0099581 A1 | 4/2013 | Zhou et al. |
| 2013/0116844 A1 | 5/2013 | McNally et al. |
| 2013/0141956 A1 | 6/2013 | Chiang et al. |
| 2013/0158901 A1 | 6/2013 | Sahinoglu et al. |
| 2013/0166084 A1 | 6/2013 | Sedighy et al. |
| 2013/0169309 A1 | 7/2013 | Bickel |
| 2013/0187454 A1 | 7/2013 | Timbus et al. |
| 2013/0238151 A1 | 9/2013 | Vaum et al. |
| 2013/0241495 A1 | 9/2013 | Min |
| 2013/0285446 A1 | 10/2013 | Chow et al. |
| 2013/0342020 A1 | 12/2013 | Blevins et al. |
| 2014/0025217 A1 | 1/2014 | Jin et al. |
| 2014/0032000 A1 | 1/2014 | Chandrashekhara |
| 2014/0058571 A1 | 2/2014 | Hooshmand et al. |
| 2014/0078625 A1 | 3/2014 | Zheng et al. |
| 2014/0084682 A1 | 3/2014 | Covic et al. |
| 2014/0088778 A1 | 3/2014 | Nguyen |
| 2014/0088781 A1 | 3/2014 | Kearns et al. |
| 2014/0097683 A1 | 4/2014 | Piyabongkarn et al. |
| 2014/0100705 A1 | 4/2014 | Shi et al. |
| 2014/0103655 A1 | 4/2014 | Burra et al. |
| 2014/0103724 A1 | 4/2014 | Wagoner |
| 2014/0103855 A1 | 4/2014 | Wolter |

(56) References Cited

U.S. PATENT DOCUMENTS

| | | |
|---|---|---|
| 2014/0129042 A1 | 5/2014 | Miner |
| 2014/0148960 A1 | 5/2014 | Bhavaraju et al. |
| 2014/0183949 A1 | 7/2014 | Murano |
| 2014/0188300 A1 | 7/2014 | Nguyen |
| 2014/0191507 A1 | 7/2014 | Holmberg et al. |
| 2014/0200722 A1 | 7/2014 | Bhavaraju |
| 2014/0214223 A1 | 7/2014 | Tsunoda et al. |
| 2014/0217826 A1 | 8/2014 | Oguchi et al. |
| 2014/0225457 A1 | 8/2014 | Elliott, II |
| 2014/0229031 A1 | 8/2014 | Amarin et al. |
| 2014/0249686 A1 | 9/2014 | Brainard et al. |
| 2014/0265596 A1 | 9/2014 | Yuan et al. |
| 2014/0292259 A1 | 10/2014 | Kim et al. |
| 2014/0306533 A1 | 10/2014 | Paquin et al. |
| 2014/0306534 A1 | 10/2014 | Shi et al. |
| 2014/0312882 A1 | 10/2014 | Dong et al. |
| 2014/0324243 A1 | 10/2014 | Markowz et al. |
| 2014/0337002 A1 | 11/2014 | Manto |
| 2014/0375125 A1 | 12/2014 | Ye et al. |
| 2015/0001931 A1 | 1/2015 | Banham-Hall et al. |
| 2015/0008737 A1 | 1/2015 | Mao |
| 2015/0019034 A1 | 1/2015 | Gonatas |
| 2015/0021998 A1 | 1/2015 | Trescases et al. |
| 2015/0032278 A1 | 1/2015 | Bhageria et al. |
| 2015/0039145 A1 | 2/2015 | Yang et al. |
| 2015/0081124 A1 | 3/2015 | Ekanayake et al. |
| 2015/0094871 A1 | 4/2015 | Bhageria et al. |
| 2015/0097437 A1 | 4/2015 | Votoupal et al. |
| 2015/0105931 A1 | 4/2015 | Forbes, Jr. |

FOREIGN PATENT DOCUMENTS

| | | |
|---|---|---|
| DE | 10 2007 005352 A1 | 8/2007 |
| EP | 0 947 042 A1 | 10/1999 |
| EP | 0 947 042 | 10/2001 |
| EP | 2 251 953 A2 | 11/2010 |
| EP | 2 325 970 A2 | 5/2011 |
| EP | 2 330 726 A2 | 6/2011 |
| EP | 2 337 178 A2 | 6/2011 |
| EP | 2 337 184 A2 | 6/2011 |
| EP | 2 339 714 A2 | 6/2011 |
| EP | 2 380 769 A1 | 10/2011 |
| EP | 1 866 717 B1 | 6/2012 |
| GB | 2434928 A | 8/2007 |
| GB | 2434928 B | 4/2010 |
| JP | 2001-507199 A | 5/2001 |
| JP | 2011-109901 A | 6/2011 |
| WO | WO 98/28832 A1 | 7/1998 |
| WO | WO 99/32762 A1 | 7/1999 |
| WO | WO 02/17475 A1 | 2/2002 |
| WO | WO 2004/038892 A2 | 5/2004 |
| WO | WO 2004/054065 A1 | 6/2004 |
| WO | WO 2005/101610 A2 | 10/2005 |
| WO | WO 2006/094128 A2 | 9/2006 |
| WO | WO 2007/018830 A2 | 2/2007 |
| WO | WO 2008/039725 A2 | 4/2008 |
| WO | WO 2008/125696 A2 | 10/2008 |
| WO | WO 2009/144737 A1 | 12/2009 |
| WO | WO 2010/042550 A2 | 4/2010 |
| WO | WO 2011/008505 A2 | 1/2011 |
| WO | WO 2011/008506 A2 | 1/2011 |
| WO | WO 2011/020149 A1 | 2/2011 |
| WO | WO 2011/124657 A1 | 10/2011 |
| WO | WO 2012/015508 A1 | 2/2012 |
| WO | WO 2012/064906 A2 | 5/2012 |

* cited by examiner

ISLAND GRID POWER SUPPLY APPARATUS AND METHODS USING ENERGY STORAGE FOR TRANSIENT STABILIZATION

CROSS-REFERENCE TO RELATED APPLICATIONS

This application claims the priority of U.S. Provisional Patent Application No. 61/712,533, entitled Island Grid Transient Frequency Stabilization Apparatus and Methods, filed Oct. 11, 2012 and U.S. Provisional Patent Application No. 61/771,417, entitled Solid State Generator (SSG), filed Mar. 1, 2013, the disclosure of each of which is incorporated herein by reference in its entirety.

BACKGROUND

The inventive subject matter relates to power systems and, more particularly, to island grid power supply systems and methods.

In power grids, the AC frequency is generally an important parameter. For example, devices attached to a grid often synchronize themselves to the grid frequency. Grid-connected devices, such as transformers, motors and the like, are typically designed to operate at or near the nominal grid frequency.

In island grid applications, generating assets, such as diesel or gas powered generators and turbines, may experience transient conditions that cause the frequency of the grid to vary significantly. These transient conditions may include, for example, large load changes and sudden changes in power source availability, such as a fuel-powered generator shutting down or a variation in supply from a generating asset such as a wind or solar generator. Such variations in line frequency may result in dropped loads or damaged equipment. Such problems may be particularly pronounced in systems that use engine/generator sets powered by natural gas or other lower energy density fuels.

Island grid generators are often sized with significant excess rated continuous power capacity in order to carry peak loads, respond to large transient load steps, and provide redundancy in support of mission-critical operations. They may operate at very high utilization rates, for example, 24 hours a day, 7 days a week, 365 days a year, but at relatively low real load factors, commonly between 15-50%, for extended periods of off-peak time. Furthermore, manufacturer warranty requirements may result in additional costs due to the use of self-imposed, manual load banks. This operating profile may result in lower fuel efficiency, excessive wear and tear on generators, and notable increases in particulate matter (PM) and hydrocarbon (HC) emissions due to the incomplete combustion of diesel or natural gas fuel.

Natural gas is becoming a more desirable fuel for power generation than diesel because of lower fuel cost and emissions. The potential drawbacks of natural gas engines include reduced step response capability and poor control performance with light loads.

SUMMARY

In some embodiments of the inventive subject matter, an island grid power supply system includes at least one energy storage unit and at least one converter coupled to the at least one energy storage unit and configured to be coupled to an island grid. The system further includes a control circuit configured to detect a frequency variation of the island grid and to responsively cause the at least one converter to transfer power between the at least one energy storage unit and the island grid. The control circuit may be configured to cause a power transfer between the energy storage unit and the island grid to compensate for a load response delay of at least one generator coupled to the island grid.

In some embodiments, the control circuit may include a frequency control loop configured to reduce a frequency error of the island grid and a power control loop configured to reduce a power transfer between the energy storage unit and the island grid. The control circuit may be configured to control a power transfer from the energy storage unit to the island grid based on a combination of outputs of the frequency control loop and the power control loop.

In some embodiments, the at least one energy storage unit may include a first energy storage unit and a second energy storage unit, and the control circuit may be configured to selectively transfer power between the first and second energy storage units and the island grid under respective first and second load conditions. The first energy storage unit may have a greater demand capability than the second energy storage unit and the second energy storage unit may have a greater energy storage capacity than the first energy storage unit.

Further embodiments provide a system including an island grid and at least one engine/generator set coupled to the island grid. The system further includes a transient frequency stabilization system including at least one energy storage unit and configured to detect a frequency deviation of the island grid and to responsively perform a momentary transfer of energy between the energy storage unit and the island grid. The transient frequency stabilization system may include at least one converter coupled to the at least one energy storage unit and configured to be coupled to the island grid and a control circuit configured to detect a frequency variation of the island grid and to responsively cause the at least one converter to transfer power between the at least one energy storage unit and the island grid.

In some embodiments, the at least one engine/generator set may include at least two engine/generator sets coupled to the grid and the system may further include a system controller configured to control the at least two engine/generator sets responsive to an availability of the transient frequency stabilization system. In some embodiments, the at least one generator may include a variable speed generator.

In still further embodiments, a system includes at least one generator coupled to an island grid, at least one energy storage unit and a converter coupled to the at least one energy storage unit and configured to be coupled to the island grid. The system further includes a control circuit configured to cause the converter to transfer power between the at least one energy storage unit and the grid responsive to a change in a load on the island grid to maintain operation of the at least one generator at a predetermined operating point. The at least one generator may include a control system configured to match generator output to the load and the control circuit may be configured to maintain the control system of the at least one generator within a predetermined dynamic response capability limit responsive to the change in the load.

BRIEF DESCRIPTION OF THE DRAWINGS

The accompanying drawings, which are included to provide a further understanding of the inventive subject matter and are incorporated in and constitute a part of this application, illustrate certain embodiment(s) of the inventive subject matter. In the drawings.

DETAILED DESCRIPTION

Figure 1:
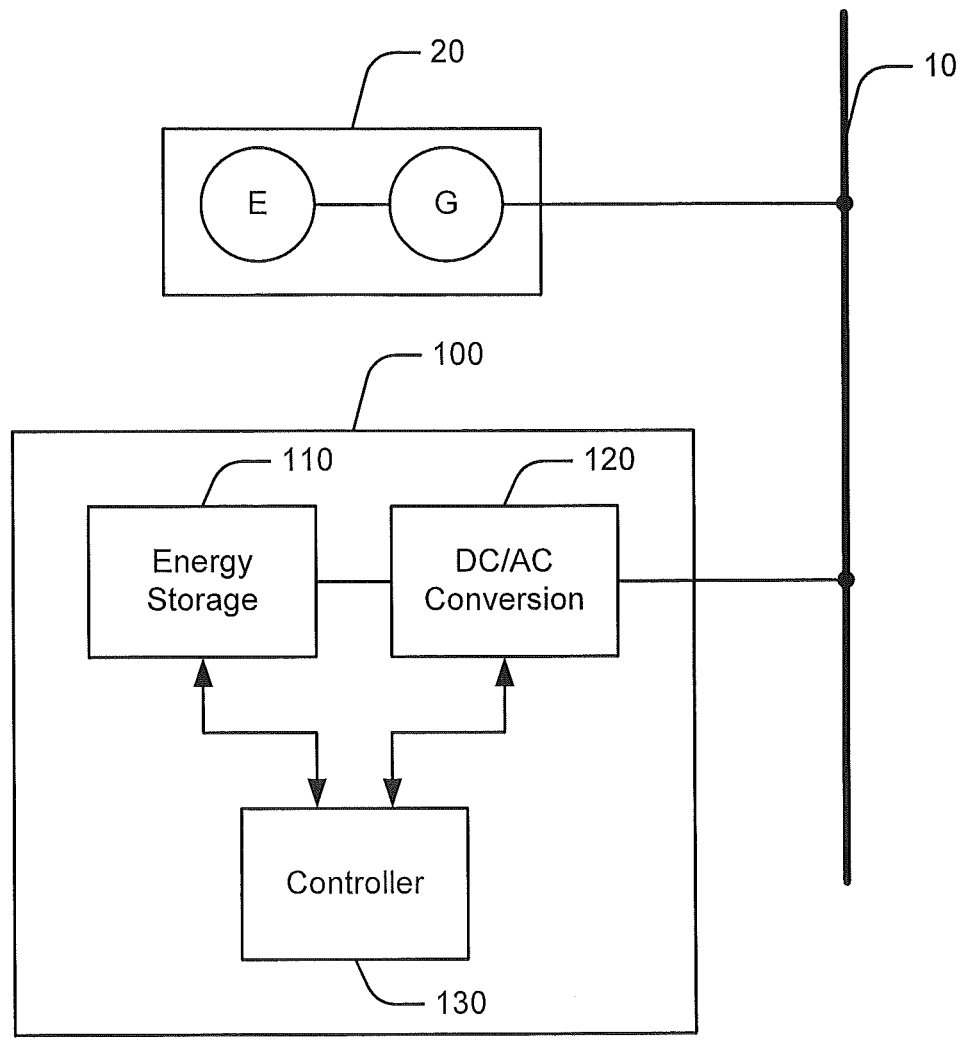
FIG. 1 illustrates an island grid power supply system according to some embodiments.

Embodiments of the inventive subject matter now will be described more fully hereinafter with reference to the accompanying drawings, in which embodiments of the inventive subject matter are shown. This inventive subject matter may, however, be embodied in many different forms and should not be construed as limited to the embodiments set forth herein. Rather, these embodiments are provided so that this disclosure will be thorough and complete, and will fully convey the scope of the inventive subject matter to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the inventive subject matter. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. It will be further understood that elements "coupled in series" or "serially connected" may be directly coupled or may be coupled via intervening elements.

Throughout the specification, like reference numerals in the drawings denote like elements. The terminology used herein is for the purpose of describing particular embodiments only and is not intended to be limiting of the inventive subject matter. As used herein, the singular forms "a", an and the are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms used herein should be interpreted as having a meaning that is consistent with their meaning in the context of this specification and the relevant art and will not be interpreted in an idealized or overly formal sense unless expressly so defined herein. The term "plurality" is used herein to refer to two or more of the referenced item.

Some embodiments of the inventive subject matter provide transient frequency stabilization systems and methods that may be used with one or more diesel, gas or other generators (piston, rotary, microturbine, fuel cell, etc.) in island grid applications. In such applications, generating assets, such as diesel or gas powered generators and turbines, may experience transient conditions that cause the frequency of the grid to vary significantly. These transient conditions may include, for example, large load changes and sudden changes in power source availability, such as a fuel-powered generator shutting down or a variation in supply from a generating asset such as a wind or solar generator. Such variations in line frequency may result in dropped loads or damaged equipment. Such problems may be particularly pronounced in systems that use engine/generator sets powered by natural gas or other lower energy density fuels.

In some embodiments, a transient frequency stabilization system may use energy storage in the form of a lithium-ion battery bank, ultra capacitor bank, flywheel storage, compressed air storage or the like that is selectively coupled to the grid using a power converter circuit (e.g., an inverter). In some embodiments, such a device may have a limited capacity and may be controlled with relatively small time constants in order to compensate for short term frequency variations. This may help reduce excessive fuel draw for rapid acceleration or deceleration and reduce mechanical stresses on engine/generator sets arising from sudden load steps. Such apparatus and methods may also help protect downstream devices from voltage sags, surges and frequency variations. Such apparatus and methods may be particularly advantageous for use in power distribution applications in which a relatively small diesel or gas generator-driven grid is subject to relatively large load changes due to the use of motors and other devices that draw heavy currents, such as in power distribution systems of large commercial vessels, work boats and remote oil and gas exploration sites. A transient frequency stabilization system according to some embodiments may be configured as a "drop-in" device that may be connected to the grid without requiring communication with an engine/generator set and/or system controller.

FIG. 1 is a block diagram illustrating a transient frequency stabilization system 100 according to some embodiments. The system 100 is coupled to an island grid 10 that is powered by at least one engine/generator set 20, which may be, for example, diesel and/or natural gas powered. The system 100 includes an energy storage unit 110 coupled to a DC/AC converter circuit 120. The DC/AC converter circuit 120 may include an inverter, along with other power processing circuitry, such as boost or buck converter circuit. A control circuit 130 controls the DC/AC converter circuit 120. State of charge, voltage, temperature and other characteristics of the energy storage unit 110 may also be monitored by the control circuit 130.

The energy storage unit 110 may include electrochemical storage, such as lithium-ion batteries and/or ultracapacitors (electro-chemical double layer capacitors) and/or other types of storage systems, such as a flywheel-based or compressed air based storage system. For example, lithium-ion cells may be stacked into series strings in order to have a usable working voltage in the range of 575 VDC to 750 VDC for directly connected storage, and 275 VDC to 750 VDC for storage connected through a DC/DC converter. The amount of energy capacity required may be relatively low. For example, in some applications, the capacity of the energy storage unit 110 may be roughly equivalent to 10 or so seconds of the output of the engine-generator set 20. For a 300 kW engine/generator set, for example, this would be approximately 1.67 kilowatt hours (kWh).

According to some embodiments, the energy storage unit 110 may not have a particularly large capacity, but may be capable of meeting a relatively high instantaneous demand for a relatively short time interval and, relatedly, capable of recharging at a relatively high rate. Devices such as ultracapacitors, hybrid battery/capacitor systems, flywheel systems, compressed air systems and the like may be capable of such high-demand performance.

The controller 130 may include, for example, a microprocessor, microcontroller or similar computing device(s), along with circuitry configured to interface the computing device(s) to the energy storage unit 110 and the DC/AC converter circuit 120. The controller 130 may include additional components, such as interface components (touchpad display, keyboard, wireless transceiver, etc.), which may display information about the state of the system and/or accept user input in order to change its operating mode or configuration, such as parameters relating to energy storage capacity, voltage limits and current limits. The controller 130 may also be configured to accept user input of information related to external devices that are also coupled to the grid 10, such as engine/generator set power rating, frequency limits, and fuel type, which may be used to control operational characteristics of the system 100. As noted above, in some embodiments, the controller 130 may operate in a standalone fashion without requiring input from an external device for normal operation. However, in some embodiments, the controller 130 may include communications interface circuitry, such as transceiver circuitry through which it can communicate using wire, fiber optic, radio and other communications media with other devices, such as SCADA system components, using, for example, protocols such as CAN(J1939), PROFINET, PROFIBUS, RS-232, Wi-Fi (802.11), GSM, CDMA, LPRS, EDGE, and the like. Such circuitry may be used, for example, to communicate status information to external devices and/or to allow for configuration and/or maintenance of the system 100.

The controller 130 may cause the DC/AC converter circuit 120 to selectively operate the energy storage unit 110 as a transient energy source and/or sink for the grid 10 to compensate for load and/or source step changes. In a non-interventive state, the DC/AC converter circuit 120 may process little or no power except, for example, to transfer energy to or from the grid 10 to maintain a desired charge level for the energy storage unit 110. When a frequency deviation associated with a load step change is detected on the grid 10, however, the controller 130 may activate the DC/AC converter circuit 120 to momentarily source or sink power in order to help restore a previously held frequency. After such an intervention to help stabilize the frequency, the controller 130 may again return to the non-interventive state.

Figure 2:
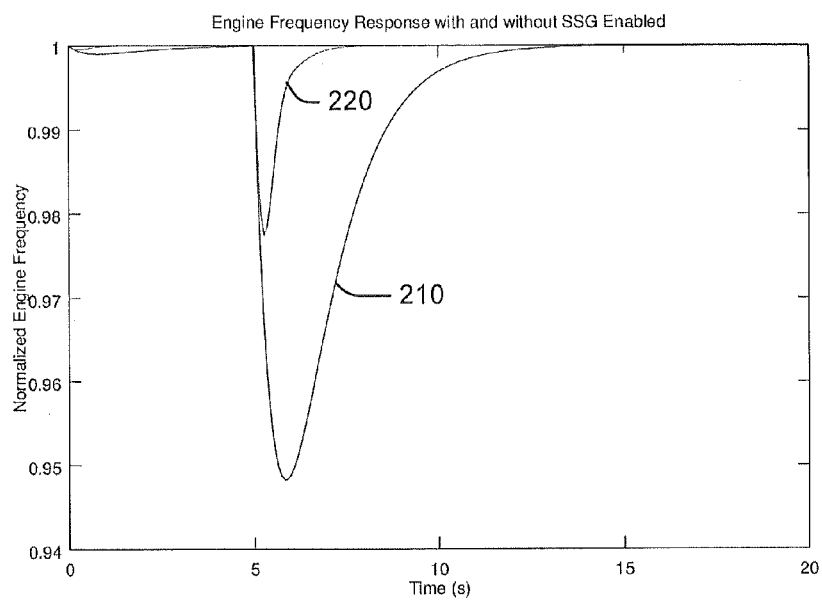
FIGS. 2 and 3 illustrate frequency and power response to a load step without and with a solid state generator (SSG) according to some embodiments.
Figure 3:
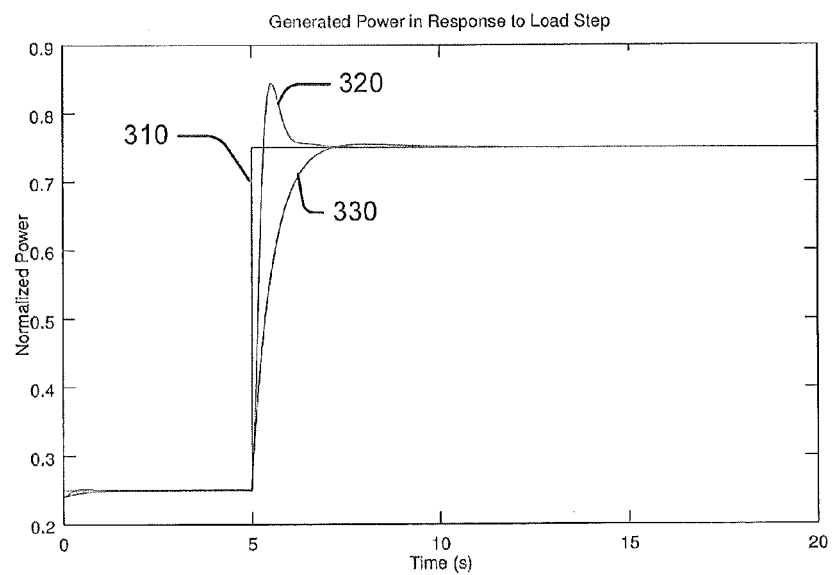

FIGS. 2 and 3 compare simulated transient engine frequency responses and output power responses, respectively, for an engine/generator set, such as the engine/generator set 20 of FIG. 1, responding to a step load change with and without a transient frequency stabilization system, such as the transient frequency stabilization system 20 of FIG. 1. In particular, FIG. 2 shows a frequency response 210 for a power system without a transient frequency stabilization system in comparison to a frequency response 220 for a power system with a transient frequency stabilization system, illustrating a frequency deviation that is reduced in extent and duration. FIG. 3 shows a power response 320 for a system without a transient frequency stabilization system in response to a load step increase 310 in comparison to a response 330 with a transient frequency stabilization system, illustrating compensation for a deficit of power in the moments following the load step change. This compensation may more quickly restore the grid to a desired nominal frequency, making up for the lag in the response of the engine/generator set.

Figure 4:
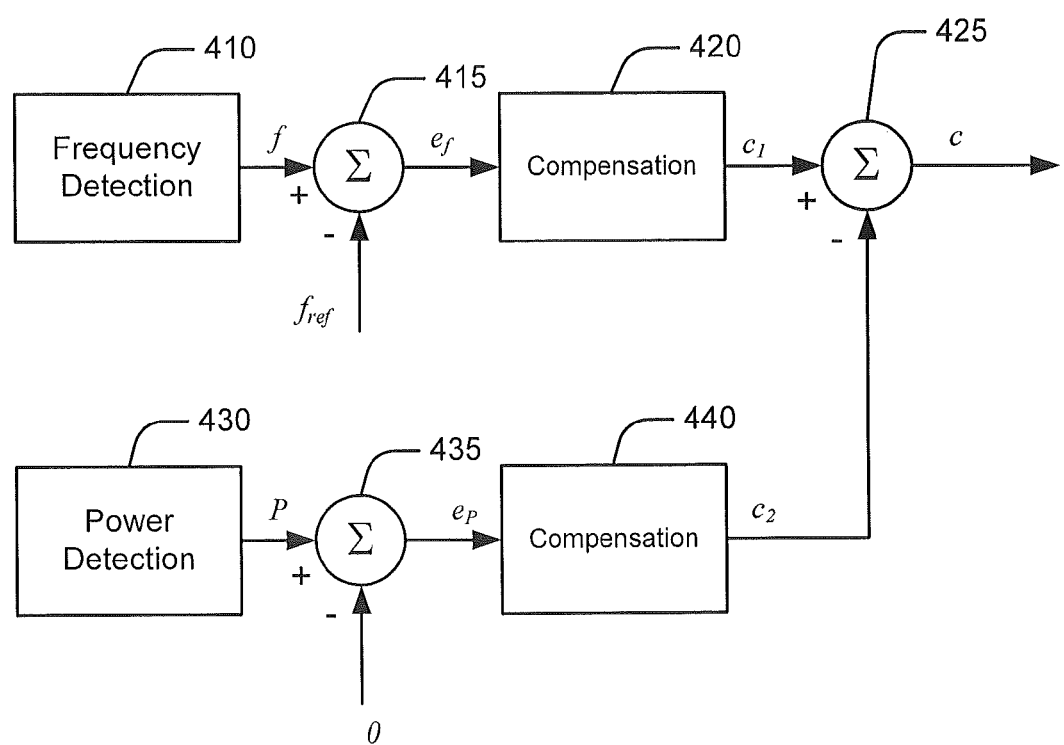
FIG. 4 illustrates frequency and power control loops for an SSG according to some embodiments.

FIG. 4 illustrates an exemplary control loop arrangement that may be implemented by the controller 130. In a relatively higher bandwidth loop that is configured to quickly respond to grid voltage frequency changes, a frequency detector 410 may be coupled to the grid 10 and configured to generate an estimate or other measure f of a frequency of a voltage on the grid 10. The frequency estimate f is compared with a reference frequency value $f_{ref}$ (e.g., a value corresponding to 60 Hz or some other frequency at which the bus is operating normally) at a summer 415, thus generating a frequency error signal $e_f$. The frequency error signal $e_f$ may be passed to a compensator 420, which may include, for example, a filter or other signal processing element(s). The frequency detector 410 may employ a phase-locked loop or other circuitry for determining frequency error. The compensator 420 produces a first converter control component signal $c_1$.

In a relatively lower bandwidth loop that controls output power of the system, a power detector 430 generates a power estimate P, which is compared to a reference power value (e.g., zero) by a summer 415 to generate a power error signal $e_P$. The power error signal $e_P$ is processed by a second compensator 440, which produces a second converter control component signal $e_2$. The first and second converter control component signals $c_1$ and $c_2$ are combined in a third summer 425, to produce a converter control signal c, which may be used to control the DC/AC converter 120. The control structure shown in FIG. 4 works to drive the frequency of the voltage of the grid back to the nominal frequency while driving power supplied from the transient frequency stabilization system 100 to zero, thus producing behavior along the lines illustrated in FIGS. 2 and 3, i.e., an intervention to more quickly restore the desired frequency, making up for a lag in the response of the engine/generator set. In some embodiments, the bandwidth of the power control loop described above may be 10 or more times less that of the frequency control loop.

It will be appreciated that the control loop architecture described above with reference to FIG. 4 is provided for purposes of illustration and that other arrangements may be used in various embodiments of the inventive subject matter. For example, the basic feedback control arrangement shown in FIG. 4 may be modified and/or supplemented to include feed forward components, non-linear components, and the like. In some embodiments, the loop may include non-linear thresholds for frequency deviation detection such that, for example, the loop only responds to deviations having certain characteristics indicative of certain types of load and/or supply step changes. The compensation within the loop may be adaptive such that, for example, different compensation is provided based on load and/or source characteristics and/or for frequency deviations caused by different types of events.

In further embodiments, frequency stabilization along the lines described above may be combined with other stabilization measures, such as reactive power and/or distortion VA control. For example, in addition to the frequency stabilization loop described above with reference to FIG. 4, a reactive power compensation loop may be provided that uses the energy storage unit 110 to source or sink reactive power to provide improved power factor and other desired effects. Such reactive power compensation may also aid in the effectiveness of the frequency compensation provided by the system, as reactive power loads may affect the capacity of generator assets to respond to load step changes.

In some embodiments, the energy storage unit 110 may be maintained at a nominal state of charge that is less than fully-charged, e.g., a state of charge that may be optimal (or near optimal) for dealing with likely charge or discharge events associated with load or source step changes. This can enable the energy storage unit 110 to sink and supply energy as necessary to perform frequency stabilization.

Figure 5:
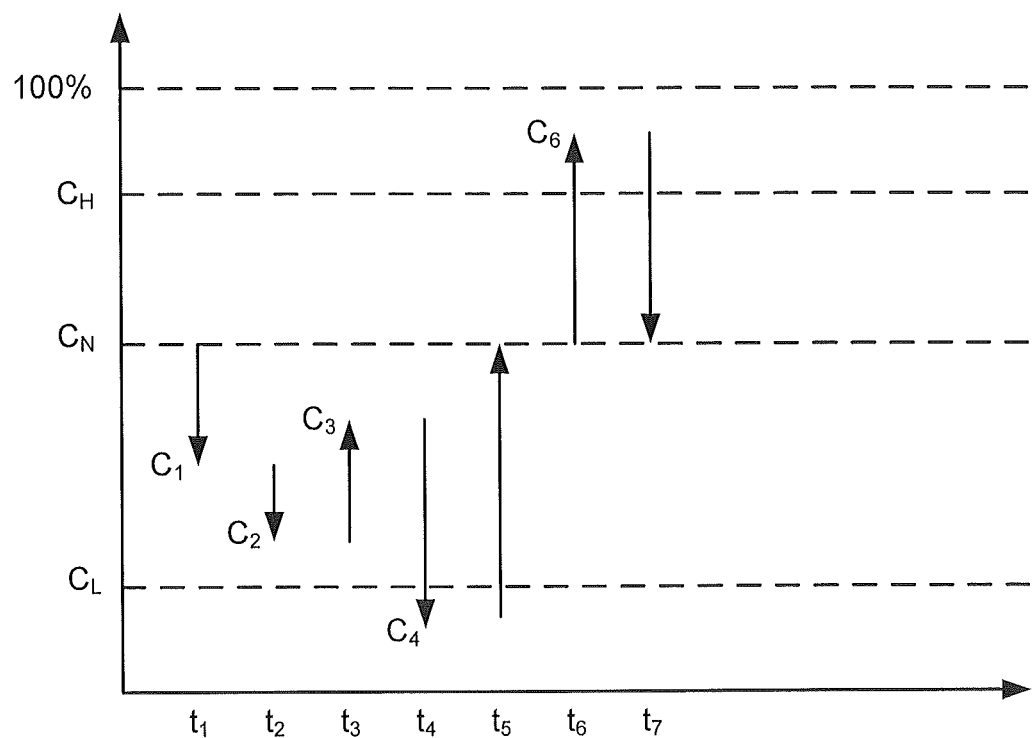
FIG. 5 illustrates charging and discharging operations of an SSG according to some embodiments.

An example of such operation is shown in FIG. 5. Referring to FIG. 5 in conjunction with FIG. 1, at a time $t_1$, a load step increase (or a reduction in source capacity) causes the controller 130 to discharge the energy storage unit 110 from a nominal charge level $C_N$, reducing the charge level of the energy storage unit 110 to a lower charge level $C_1$. At a subsequent time $t_2$, another load step increase occurs, causing a further discharge to a charge level $C_2$. At a subsequent time $t_3$, a load step decrease (or source increase) occurs, and the control circuit 130 causes the DC/AC converter 120 to transfer energy to the energy storage unit 110, resulting in an increase to a charge level $C_3$.

At a time $t_4$, however, another major load step increase occurs, causing the energy storage unit to be discharged to a state $C_4$ that is less than a lower threshold charge level $C_L$. In response, the controller 130 causes the DC/AC converter 120 to transfer charge from the grid 10 to the energy storage unit 110 until its state of charge returns to the nominal charge level $C_N$. As further shown, a subsequent load step decrease at a time $t_6$ may raise the charge state of the energy storage unit 110 to a charge level $C_6$ above a higher threshold $C_H$, thus causing the control circuit to discharge the energy storage unit 110 to the grid 10 to return the energy storage unit 110 to the nominal charge level $C_N$. In this manner, the charge of the energy storage unit 110 is maintained within bounds that allow the system to respond to both positive and negative load and source changes.

It will be appreciated that the operations shown in FIG. 5 are illustrative of embodiments of the inventive subject matter, and that variations or modifications of these operations may be used in various embodiments of the inventive subject matter. For example, although FIG. 5 illustrates a sequence of discrete charge/discharge events, it will be understood that charging and discharging may be done in a continuous or quasi/continuous manner. It will be appreciated that, in various embodiments, charging control models and parameters thereof, such as levels to which an energy storage unit is charged (e.g., the nominal charge value $C_N$) or charge thresholds (e.g., the charge thresholds $C_L$, $C_H$) may be tailored to the particular application based on a priori information and/or real-time input. For example, the system could take overall system load and fuel-based (dispatchable) generator capability into account in setting the nominal state of charge of the energy storage unit at a level that is desirable for handling load transients. Control models and parameters may also be varied based on monitoring of charge and discharge related events using, for example, adaptive filtering or other predictive techniques.

Maintaining an energy storage source at a less than fully charged state may provide operational advantages, particularly in devices that are to be used in harsh environments. For example, the life of an ultracapacitor life may be dependent on the voltage maintained across the ultracapacitor under given environmental conditions, such that operating an ultracapacitor at significantly less than full rated voltage (on average) may allow the ultracapacitor to be utilized in environments that experience greater temperature extremes. Therefore, a system using ultracapacitors for energy according to some embodiments may be used in harsher environments that lack climate controls, such as the environments typically present in resource exploration, military and marine applications, without significantly degrading the reliability and lifetime of the energy storage and without requiring energy-consuming and potentially reliability-reducing heating and/or cooling systems.

Figure 6:
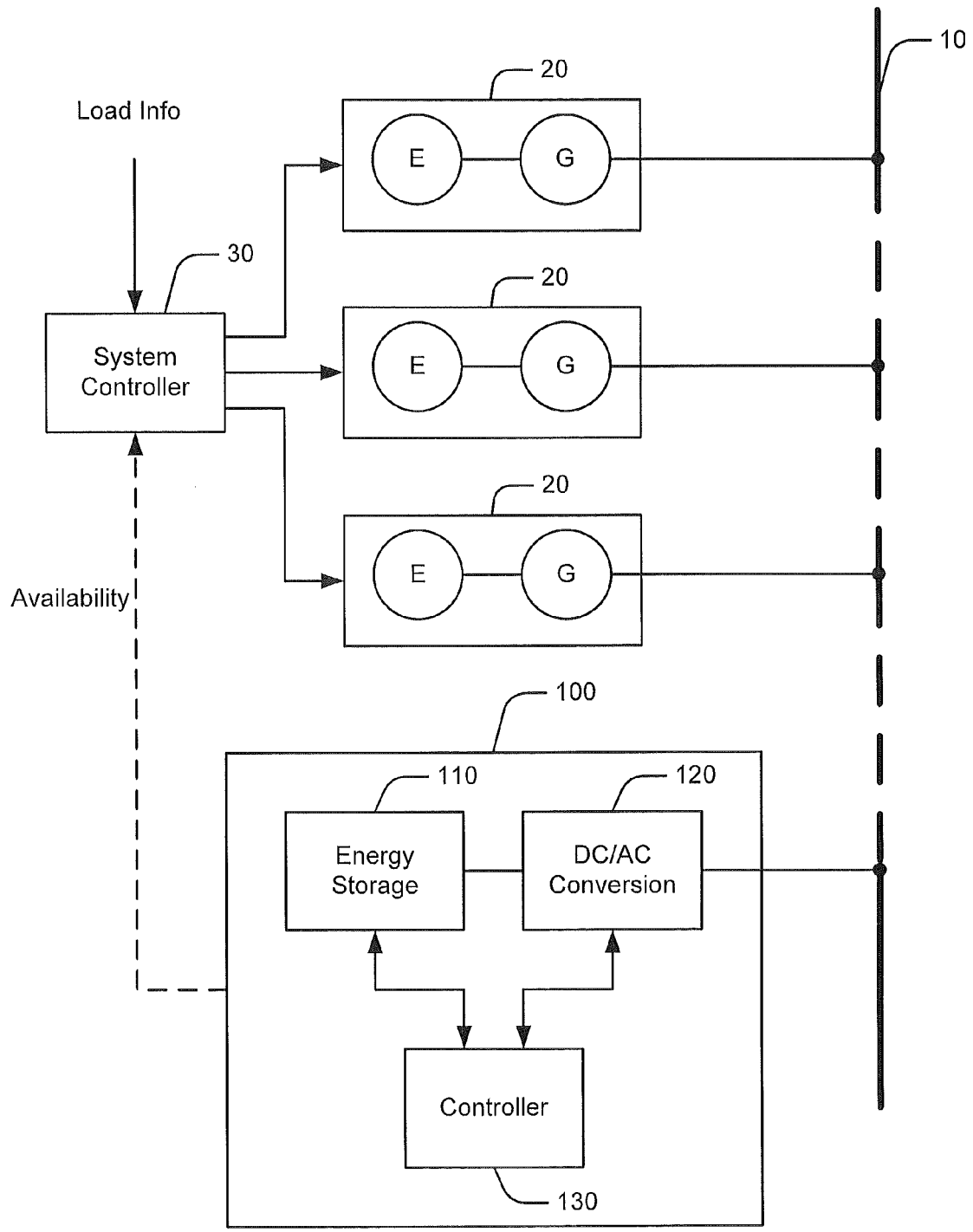
FIG. 6 illustrates an island grid power supply system using fixed speed generators in conjunction with an SSG according to further embodiments.

Some embodiments of the inventive subject matter may be advantageously used in island grid applications such as commercial vessels and resource exploration sites. For example, an exploration site may include a local power distribution grid 10 powered by one or more diesel or natural gas powered engine/generator sets 20, as shown in FIG. 6. The engine/generator sets 20 may be located together and/or may be distributed around a site and separated by distances in terms of miles. Each engine/generator set 20 may include its own internal control system, such as an engine speed control loop that is designed to control fuel flow to the engine to maintain a desired generator speed as loading of the generator changes. One or more of the engine/generator sets 20 may also be configured to provide variable speed generation, e.g., one or more of the engine/generator sets 20 may include a control system that allows the engine of the engine/generator set to be operated at lower speeds to increase fuel efficiency.

A system controller 30 may be configured to control operation of the engine/generator sets 20, along with ancillary components, such as circuit breakers and other switches, used with the engine/generator sets 20. In an exploration site, for example, such a controller 30 may be used to determine how many of the engine/generator sets 20 should be active to meet anticipated load and/or source changes on the grid. For example, some equipment, such as pumps and drill motors, may cause relatively large load steps that can cause the rotors of the engine/generator sets 20 to slow or accelerate appreciably. Although a control loop of an engine/generator set 20 may compensate for the changed load, delays in fuel injection and the generator control loop combined with the inertia of the generator rotor can cause significant response delays, which may cause the frequency of the grid to deviate from nominal for a significant period of time. Accordingly, in conventional installations, it is common to run significantly more engine/generator sets than required to meet the current steady-state load in order to reduce the extent and duration of such frequency excursions when a load step occurs. This can be fuel-inefficient, increase emissions and can increase wear and tear on the engine/generator sets.

Figure 7:
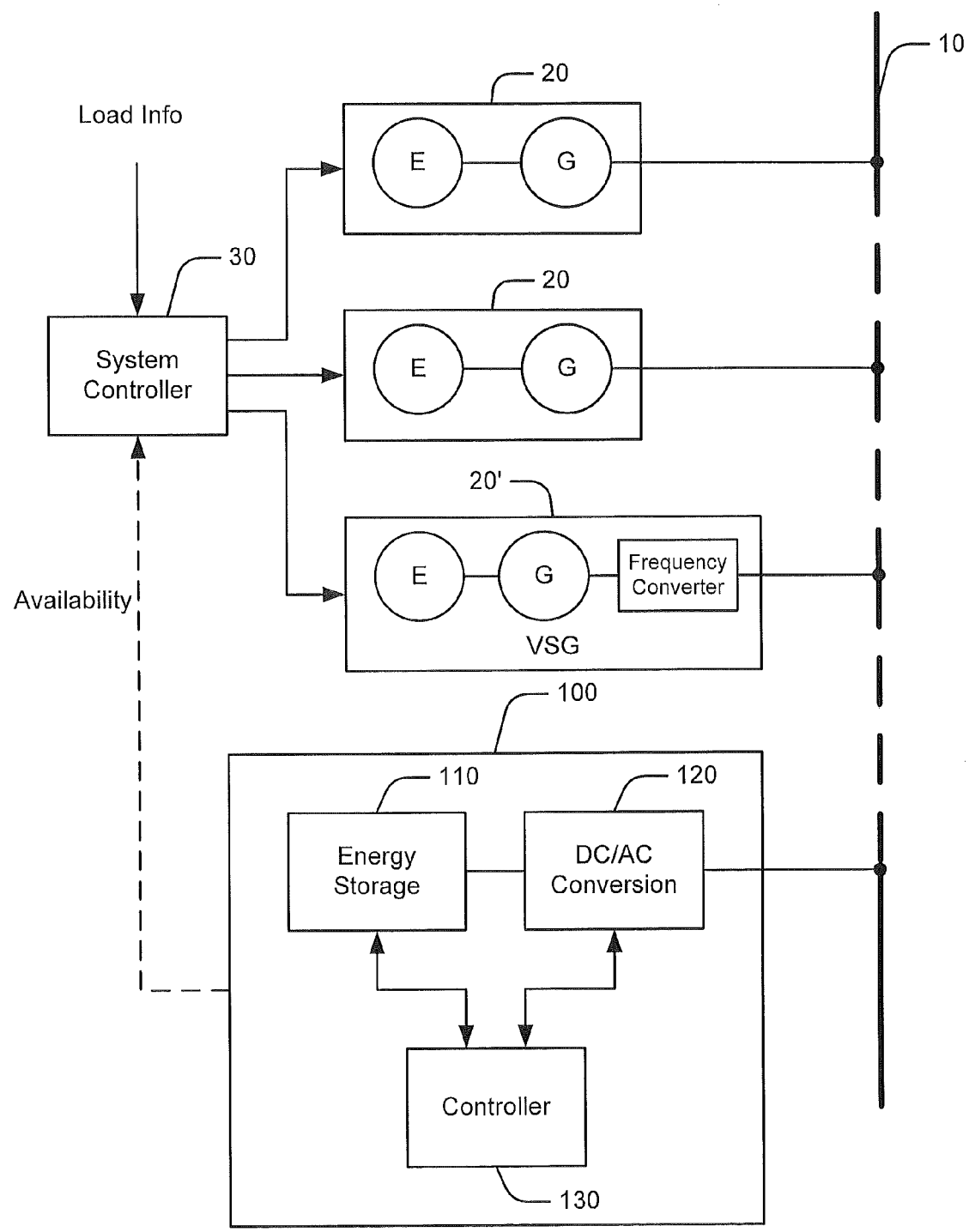
FIG. 7 illustrates an island grid power supply system using fixed and variable speed generators in conjunction with an SSG according to further embodiments.

As further shown in FIG. 6, a transient frequency stabilization system 100 along the lines discussed above with reference to FIG. 1 may be coupled to the grid 10 to provide transient frequency stabilization that allows the system controller 30 to reduce or otherwise optimize the number of active engine/generator sets 20 needed to meet load step changes. The system controller 30 may assume the availability of the transient frequency stabilization system 100 and/or may receive status information to that affect therefrom, and may control the engine/generator sets 20 based on that availability information and information pertaining to the load on the grid 10. Such load information may be provided to the system controller 30 in a number of different ways, including from the sensors coupled to the grid 10, the engine/generator sets 20 and/or the transient frequency stabilization system 100. In some embodiments, the transient frequency stabilization system 100 may provide capacity and other information, which the system controller 30 may use to determine how to control the engine/generator sets 20. Referring to FIG. 7, the system may include one or more variable speed engine/generator (VSG) sets 20' that may be operated at different engine speeds. As shown, the VSG set 20' may include a generator G that is driven by an engine E and linked to the grid 10 by a frequency converter FC, which allows the generator G to be run a reduced engine speeds while maintaining the appropriate output frequency at the grid 10. The system controller 30 may also determine a set point for the engine/generator set 20' based on availability and/or capacity of the transient frequency stabilization system 100.

As noted above, a device that provides momentary frequency stabilization as described above may also be used to control reactive power, distortion VA and other grid variables on a short-term or long-term basis. According to some embodiments, this capability may be achieved by including both short-term, high-demand energy storage with longer-term, higher capacity storage. For example, as illustrating in FIG. 8, a transient frequency stabilization system 100' may utilize high-demand energy storage 110 (e.g., ultracapacitors) with relatively low capacity for frequency stabilization, reactive compensation, etc., along with higher-capacity storage 140 (e.g., a lithium-ion battery bank) that may be used for longer-term compensation. As shown, the higher-capacity storage 140 may be coupled to the grid by a separate converter 150. It will be appreciated, however, that higher-capacity storage may be combined with high-demand storage in other ways, such as by coupling to a common internal DC bus.

For example the higher-capacity storage 140 may be used for compensation of transient overload events of a relatively longer duration than the transient load step events described above. For example, if the system controller 30 and/or the controller 130 of the frequency stabilization system 100' have a priori knowledge of load events that may intermittently overload the capacity of the currently active ones of the engine/generator sets 20, but that have a predictable and limited frequency and extent. The system 100' may use the high-capacity storage 140 to "ride out" these events without having to run an additional one of the engine/generator sets 20 to provide additional ready capacity to meet such demand events. This approach may allow the engine/generator sets 20 to be operated in a manner that increases fuel efficiency and that reduces emissions, noise and wear.

Figure 8:
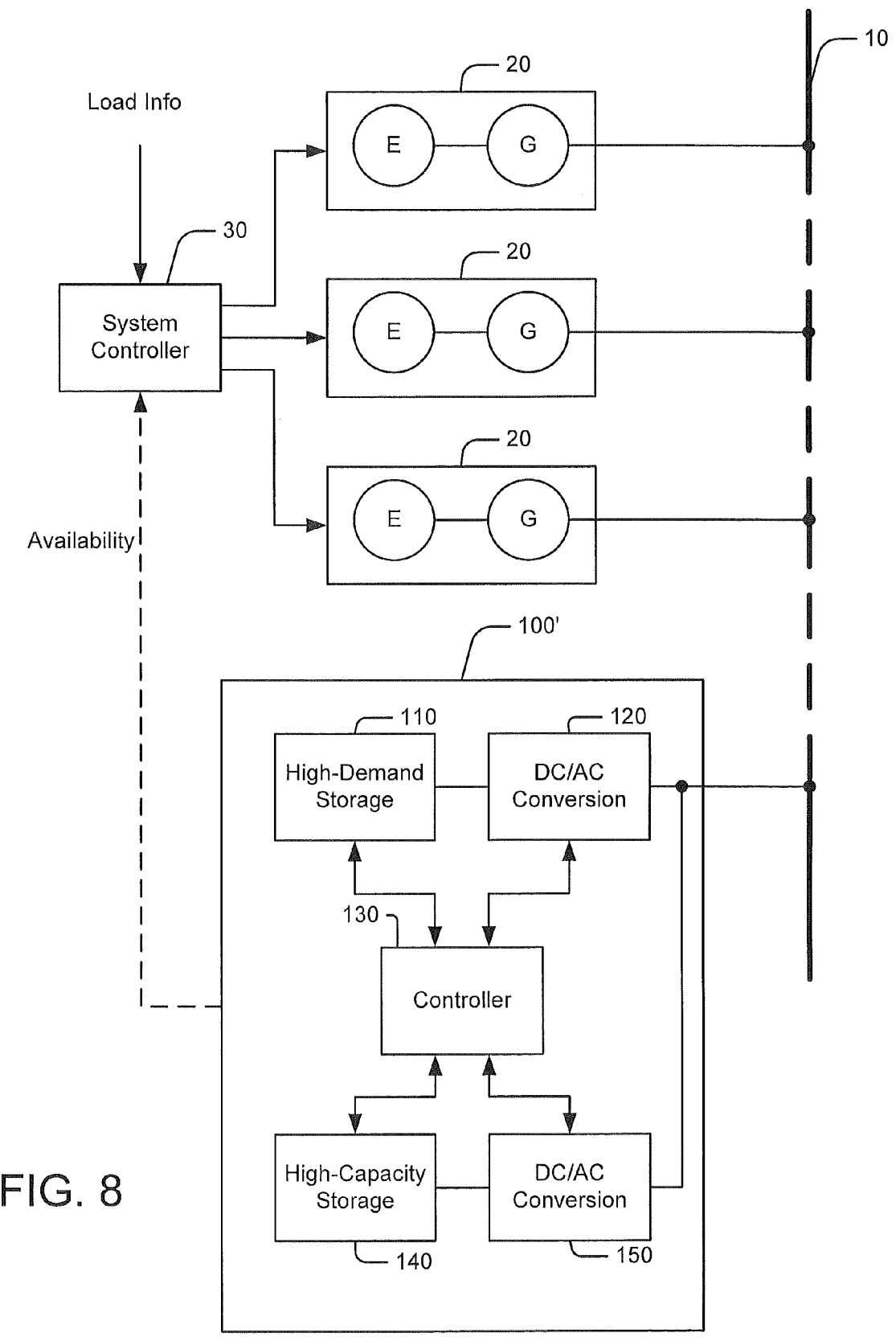
FIG. 8 illustrates an island grid power supply system using an SSG having energy storage units with differing demand capability and storage capacity according to further embodiments.

The embodiments of FIGS. 6-8 illustrate power distribution system architectures that may be particularly attractive for generating significant efficiency gains in existing systems without requiring elaborate and expensive modifications of existing equipment. For example, frequency stabilization systems such as those illustrated can be added an existing power distribution system at an exploration site or in a vessel without requiring undue modifications to generators and other existing equipment that may reduce reliability of those devices and/or void warranties. Hardware may be flexibly designed to operate with a range of equipment models and capacities. Existing power systems often utilize programmable controllers for system controls (e.g., for the system controller 30 shown in FIGS. 6-8), and changes to such system controls may only require software modifications and/or minor modifications that provide additional control inputs and outputs.

Some embodiments of the inventive subject matter use diesel and gas generator hybridization technology that integrates configurable energy storage, power converter and controls with a wide range of generators, such as diesel engine/generator sets, gas engine/generator sets and gas turbine engine/generator sets, to potentially reduce fuel consumption, emissions, sound, vibration and maintenance costs without unduly impacting the performance, safety or reliability of the power system. Embodiments may be particularly advantageous in commercial island grid diesel and gas power systems.

Island grid generators are typically sized with significant excess rated continuous power capacity in order to carry peak loads, respond to large transient load steps, and provide redundancy in support of mission-critical operations. They typically operate at very high utilization rates, usually 24 hours a day, 7 days a week, 365 days a year, but at relatively low real load factors, commonly between 15-50%, for extended periods of off-peak time. Furthermore, manufacturer warranty requirements may result in additional costs due to the use of self-imposed, manual load banks. This operating profile may result in lower fuel efficiency, excessive wear and tear on generators, and notable increases in particulate matter (PM) and hydrocarbon (HC) emissions due to the incomplete combustion of diesel or natural gas fuel. Some embodiments of the inventive subject matter provide a solid state generator (SSG) systems and methods of operating the same that may increase efficiency and reduce emissions.

Figure 9:
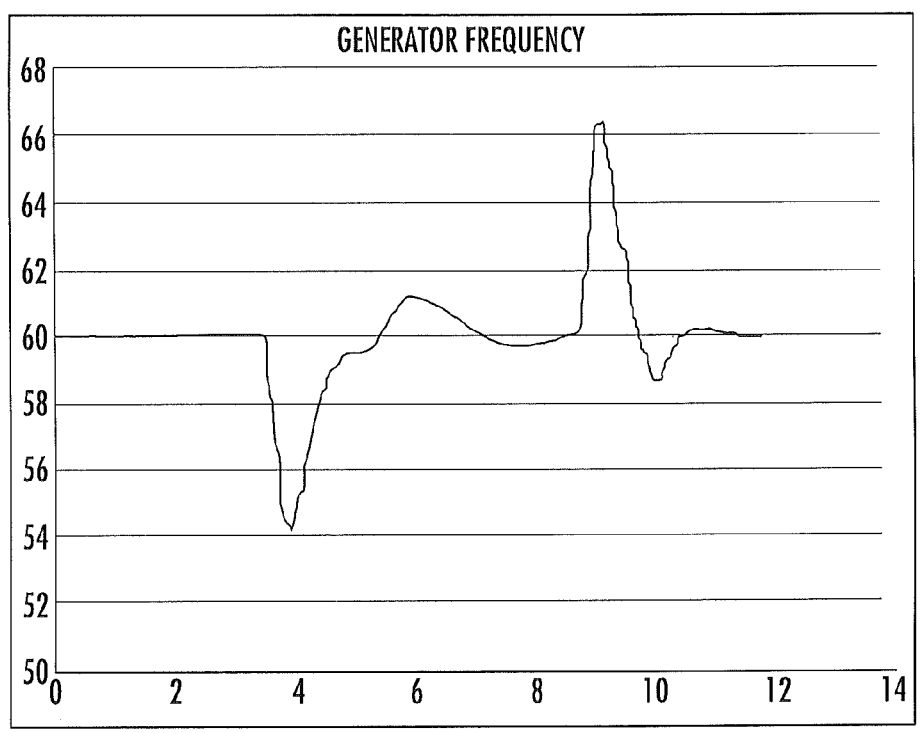
FIG. 9 illustrates frequency response of a typical diesel generator.

A typical diesel generator with a 100 kW-1 MW power range is capable of meeting a 5% frequency regulation while a maximum load of 50% is applied in one step. FIG. 9 shows the response to a 100% load step being applied to a diesel generator. The typical target for frequency accuracy for marine, industrial and residential loads is 5% or (+−2.5 Hz). The generator used in the above example would not meet this specification with a 100% load step.

Natural gas is becoming a more desirable fuel for power generation than diesel, because of lower fuel cost and improved emissions. The potential drawbacks of natural gas engines include reduced step response capability and poor control performance with light loads.

Table 1 below presents a snapshot of a conventional natural gas engine's step response performance:

TABLE 1

|  | Dynamic Frequency Deviation | Dynamic Voltage Deviation | Recovery Time to SS |
|---|---|---|---|
| 1$^{st}$ Load Step |  |  |  |
| 25% Load Step | +/−16% | +/−12% | 20 Sec |
| 25%* | +/−10% | +/−12% | 10 Sec |
| 10% | +/−5% | +/−3% | 5 Sec |
| 5% | +/−2.5% | +/−1% | 5 Sec |
| SS | +/−1% | +/−1% |  |

*Note: Valid for block loads above the initial 25% load step

If the load requires a 5% frequency regulation, the above engine is capable of accepting only around a 10% load change, compared to a diesel engine, which may accept around a 50% load change.

Figure 10:
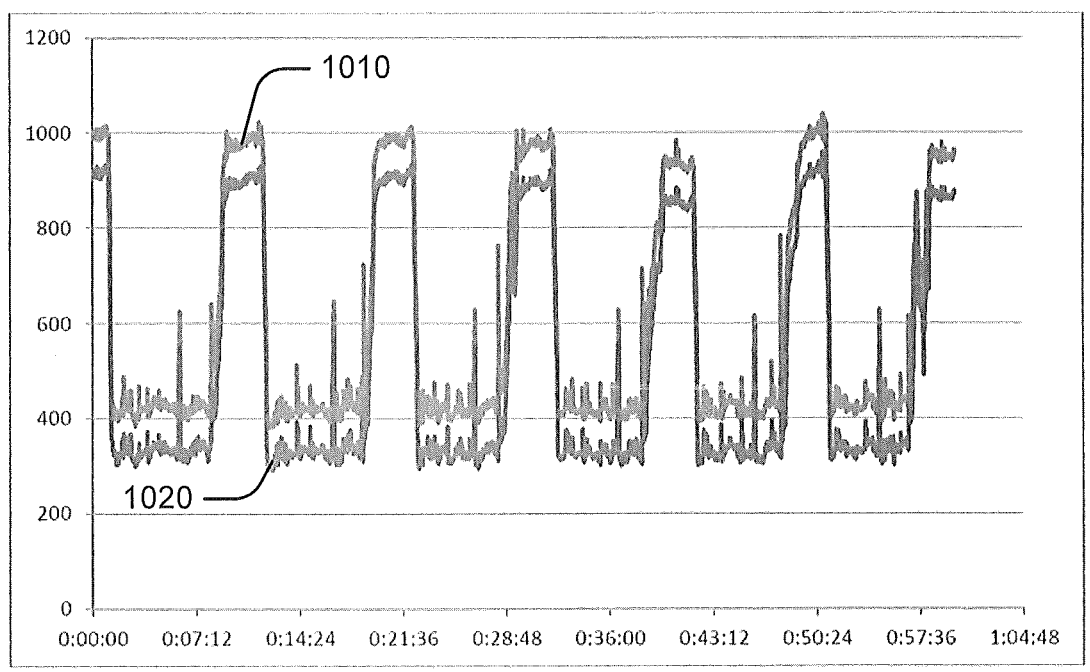
FIG. 10 illustrates an example of a typical load profile for an industrial, marine or oil & gas site.

There are a wide variety of different load profiles that island grid generators may support. FIG. 10 shows a repetitive load profile (kW 1010 and kVA 1020) that may be seen in an industrial, marine or oil & gas site. An analysis technique may apply the following metrics to a generic load profile as shown in Table 2:

TABLE 2

| Metric | Description | Unit of measure |
|---|---|---|
| 1 | Average power | [kW] |
| 2 | Base load | [kW] |
| 3 | Peak load | [kW] |
| 4 | Number of transient peaks | [count] |
| 5 | Rise time in 25, 50, 75 and 100% of peak | [kW/s] |
| 6 | Fall time in 25, 50, 75 and 100% of peak | [kW/s] |
| 7 | Duration of peaks | [s] |
| 8 | Load bank usage kWh | [kWh] |
| 9 | Multi generator run time | [s] |

Based on the above metrics and customer specific cost of fuel information, it is possible to select the optimal size SSG storage and power converter model for each customer application.

In order to determine the full cost of ownership in an island grid generator installation and operation, the following costs may be accounted for:

Initial cost of engine(s)
Initial cost of alternator(s)
Cost of power system materials, breakers, wiring, fusing, transformers
Load bank capital cost
Initial installation cost
Fuel cost to support end customer load
Fuel cost to support load bank (if applicable)
Fuel cost of running second redundant generator (if applicable)
Maintenance cost of second redundant generator
Cost of generator inefficiency (non-optimal operating point)
Generator maintenance cost, oil, filters, routine maintenance
Periodic generator top end and major overhauls
HVAC cost to condition engine room (if applicable)
Excess capital and maintenance cost of equipment engineered to operate under large frequency deviations: motors, variable frequency drives, pumps, etc.

Once an industrial island grid power system is designed, special attention may be paid to back-feed power considerations. If the load profile has a regenerative/back-feed power requirement, an active motor break or passive load bank may be advantageous. A typical island grid generator might not be capable of sinking significant amounts of energy. In the case of reverse power, the generator might go over speed, trip off due to over frequency or possibly suffer damage to the alternator or engine. In order to properly design the power system, load banks are commonly used. Drawbacks of using the load bank are excessive fuel consumption and in some cases increased heat. Load banks are also used for pre-loading the generator, so that in the initial load step, it would meet the desired transient frequency requirement. If a passive load bank is used for creating this base load, it may also create an unnecessary operational cost burden.

In order to minimize these unwanted load bank energy charges, an SSG system according to some embodiments of the inventive subject matter may be used. The SSG system may not only address the transient response issues but may also function as an electronic load bank.

In order to understand the physics behind the limited step response capability of diesel and natural gas engines, it may be useful to look into a formula that represents mechanical and electrical energy parameters in a dynamic system model:

$$E = \frac{1}{2}I\omega^2$$

$$T = T_M - \frac{P_L}{\omega} = I\alpha$$

where
E=kinetic energy stored in the rotor
I=rotational inertia (related to the mass of the rotor)
ω=angular velocity
T=total rotor torque
$P_L$=electrical load
$T_M$=engine torque, controlled by injection rate and engine governor lag
α=rotational acceleration Typical natural gas engines use a single manifold fuel feed, which generally limits how fast a pressurized fuel mixture of oxygen and natural gas can be increased in a combustion chamber. This lag may restrict how fast the mechanical torque can be increased. As can be seen from the above formula, if there is a constant power demand from the load, given the limited mechanical torque change, the speed of the engine may change as a function of kinetic mass. There is a direct relationship between axle speed and output to critical customer load bus frequency. If a customer has certain frequency regulation requirements, the above dynamical dependency will generally limit the maximum single load step that a natural gas engine can support.

System engineers have addressed the frequency step response issue by oversizing generators and/or by utilizing additional mechanical mass, like flywheels, to mitigate the issue through mechanical means. Other mechanical engineering solutions to transient problems include dual fuel and dual-concentric needle design. All these may improve performance but may not solve the fundamental issue of insufficient power during transients. Even if these alternative mechanical engineering based solutions are used, there still remains the challenge of natural gas engines, which may require load bank usage.

Modern high efficiency power conversion and high efficiency storage chemistries enable system designs that add electrical energy storage, which may be used to overcome the limitations of mechanical energy storage. In a SSG system according to some embodiments of the inventive subject matter, electrochemical storage can be sized in a cost efficient manner while at the same time using a smaller footprint. SSG in combination with a natural gas generator may provide a step response that meets or exceeds a diesel generator step response performance. A good time to consider SSG is during the initial system design of new construction. Benefits of the SSG system may include reducing the generator size, matching the average load, removal of load banks, increased fuel efficiency, and lower emissions. Basic operations of an SSG system according to some embodiments are illustrated in FIG. 11 and described below.

Traditionally, generator controllers are programmed to implement voltage to frequency droop where the output voltage changes in proportion to: the output frequency to enable paralleling and improve the frequency response. In the case of a resistive or passive load, this droop method may be useful in addressing the frequency regulation problem. However, many industrial processes use active Variable Frequency Drives (VFD), which may demand substantially constant power. In the case of a load requiring constant power, voltage drop due to the frequency droop may be harmful, causing current ratings of devices to be exceeded and circuit breakers to be prematurely tripped. When using an SSG according to some embodiments of the inventive subject matter as part of a system, the active VFD loads may be served from the SSG without little or no adverse effect to the generator. SSG may provide transient magnetizing current as well as transient active power energy storage, allowing an engine to operate within its dynamic response capability limits and at a desirable operation point. This may result in improved fuel efficiency and reduced emissions.

Figure 11:
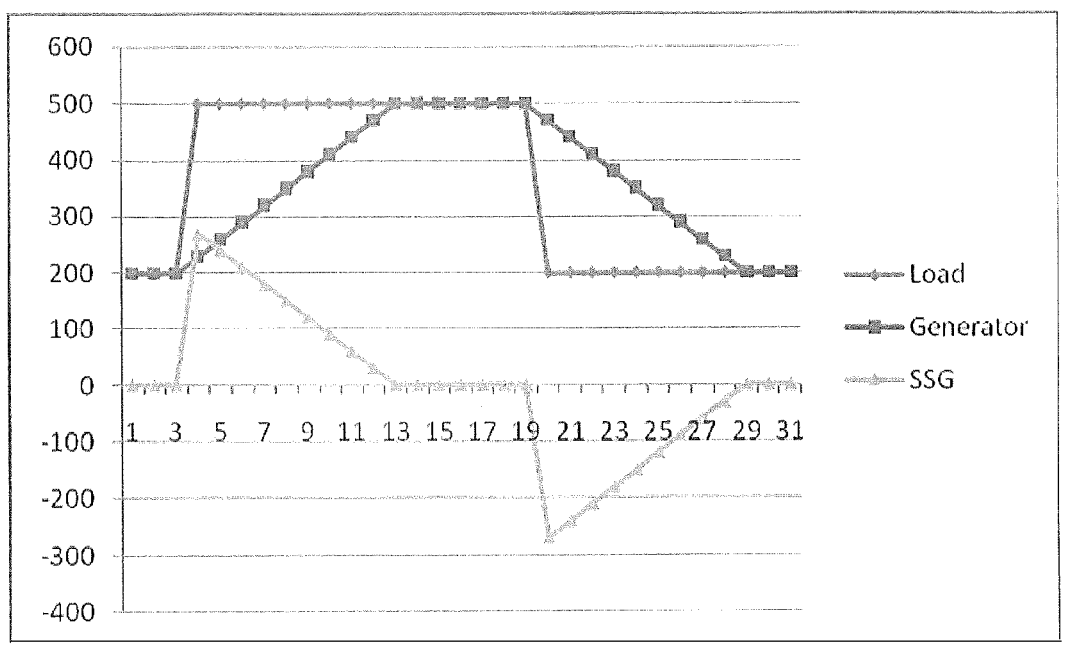
FIG. 11 illustrates operations of generator and SSG components of an island grid power supply system according to some embodiments.
Figure 12:
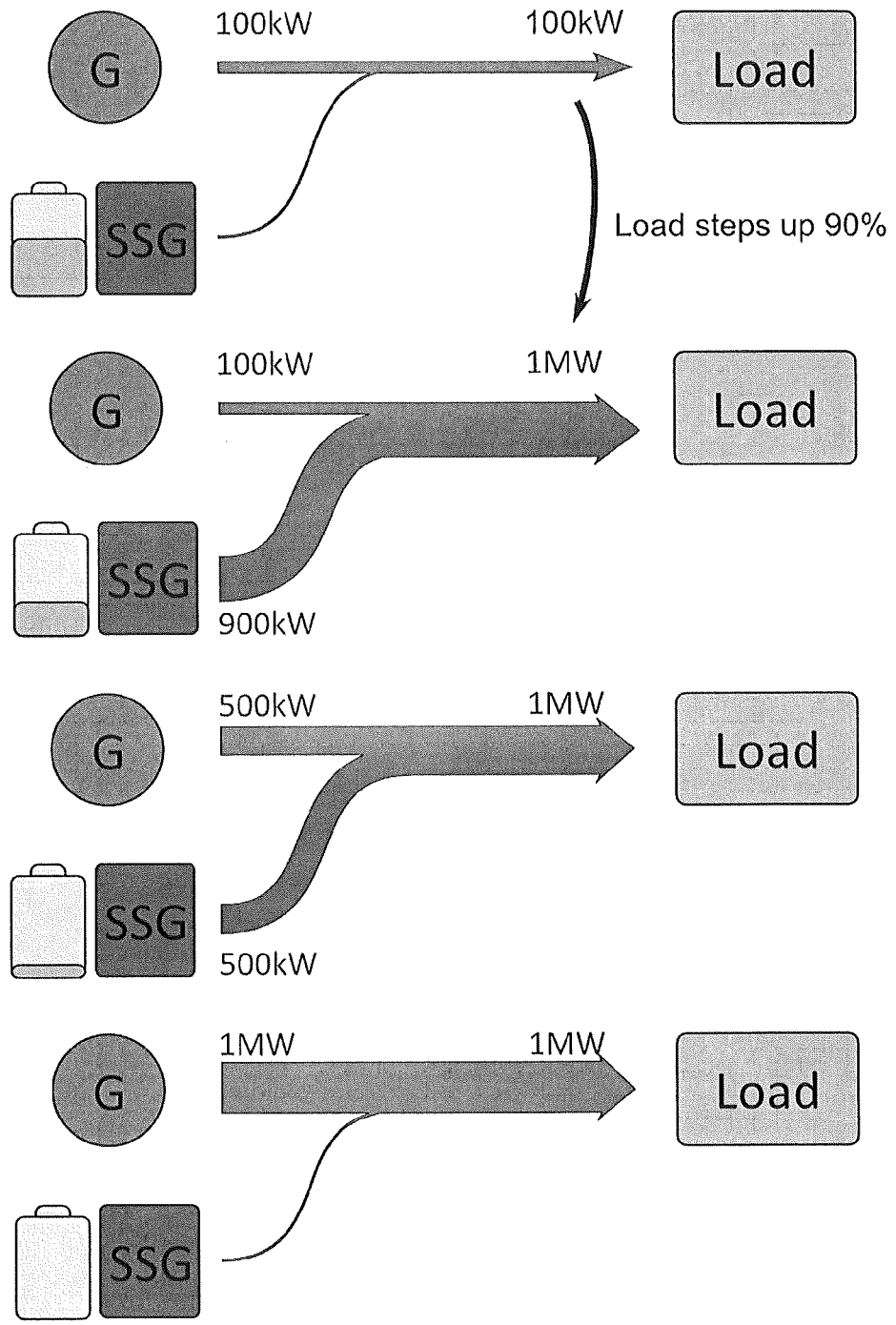
FIGS. 12 and 13 illustrate generator and SSG power flows of an island grid power supply system according to further embodiments.
Figure 13:
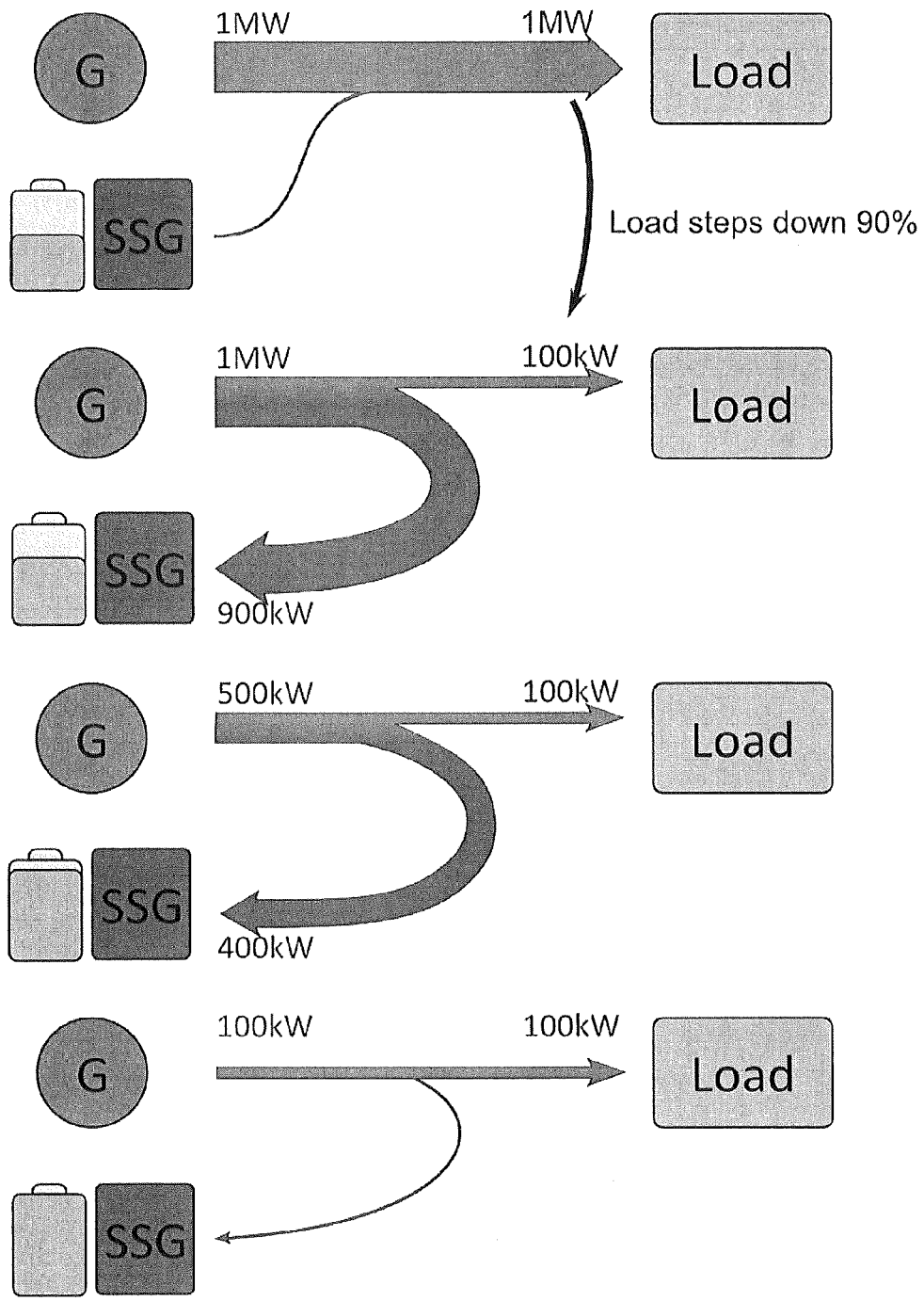

FIG. 11 shows response of a generator and SSG to step load increases and decreases. FIG. 12 illustrates behavior of a system with at least one generator G and a solid state generator SSG during a 100 kW to 1 MW (90%) load step (the storage element charge level is illustrated on the left side of the figure, and arrows illustrate the SSG active power flow). After this discharge sequence, the storage may be charged back to its desired average charge level. FIG. 13 illustrates behavior of the solid state generator SSG and the at least one generator G during load removal in the case of non-regenerative braking.

Figure 14:
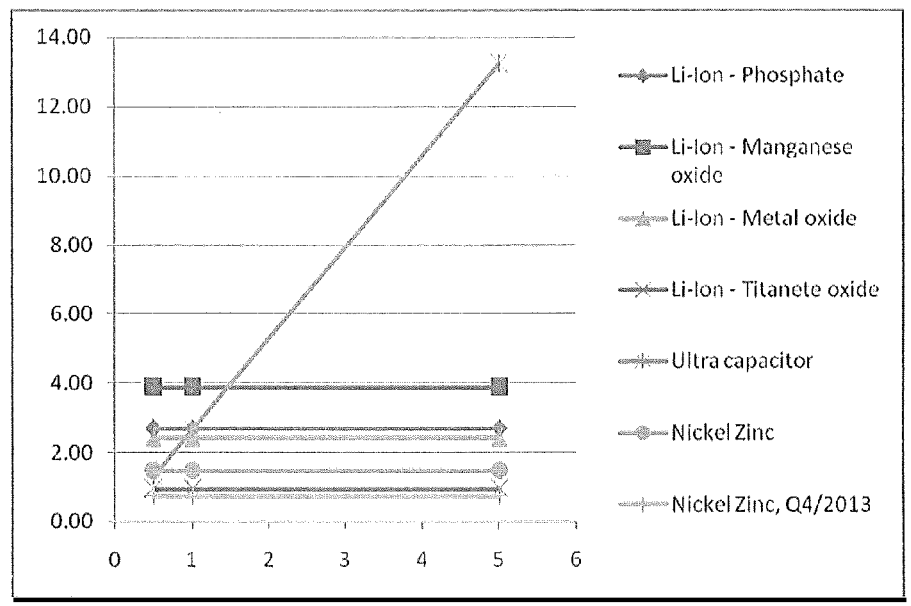
FIGS. 14 and 15 illustrate volume versus storage capacity characteristics of various types of energy storage devices.
Figure 15:
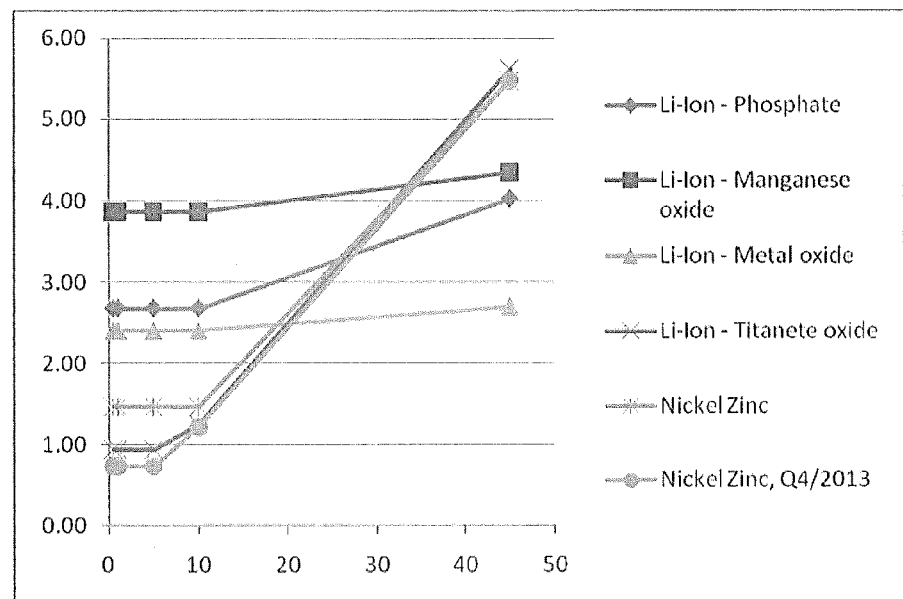

Storage chemistry and size are factors in optimizing the SSG storage element. There are several high-efficiency storage chemistries available, such as different variants of Li-Ion, NiZn, ultra-capacitors, and hybrid ultra-capacitor solutions. FIGS. 14 and 15 show several different storage chemistry solutions where volumetric size (vertical axis) is compared as a function of run time (horizontal axis) in minutes. FIG. 14 shows that in order to maintain a reasonable volumetric size of an ultra-capacitor solution, runtime may be limited, e.g., to less than 2 minutes. In order to better visualize the differences between the other chemistries, FIG. 15 shows the same information, except for ultra-capacitors, on an expanded time scale.

The cyclic load profiles found in industrial and oil and gas (O&G) customer cases may require as high as 100,000 cycles in a 3-5 year storage life. A 5 year life is considered a desired minimal customer requirement for fielded life expectancy. Based on the information in FIGS. 14 and 15, ideal storage chemistry for short duration transient response electrochemical storage may be a NiZn or Li-Ion titanate oxide ("LTO"). However, cycle life capability of each chemistry may also be considered in making a choice of storage chemistry.

LTO cycle life can be as high as 6,000-9,000 full depth of discharge cycles as specified from vendors. When very light depth of discharge usage occurs as part of SSG, the Li-Ion battery may meet the 100,000 cycle requirement. Depending on a specific customer's load profile, LTO may be a suitable option for storage selection, assuming that environmental and cost requirements meet customer needs.

NiZn has a very limited cycle life and therefore is generally not suitable for high cycle life application, even though it is the most energy dense storage chemistry available.

A typical ultra-capacitor cycle life is 1,000,000 cycles. The life of an ultra-capacitor is largely a function of float voltage and temperature. In an SSG application, the float voltage may be kept low in order to have storage available for regenerative braking. That may allow exploitation of a full potential life cycle of storage without significant oversizing.

A technical challenge of utilizing ultra-capacitors is a wider voltage swing compared to other storage chemistries. The proper power conversion selection may be addressed by utilizing rugged, high overload capable, water cooled drives. Power converters may use a topology that enables maximum extraction of energy in all operating conditions from ultra-capacitors.

As presented in the above description, an SSG system according to some embodiments of the inventive subject matter may achieve significant cost savings through a technical solution for power generation challenges. Potential benefits include:

Savings in initial engine cost
Reduced size requirement of alternator
Reduced cost of power system materials, breakers, wiring, fusing, transformers
Removal of load banks
Reduced installation cost
Reduced ongoing fuel expense
Removed redundant generator
Reduced generator maintenance cost, oil, filters, routine maintenance
Reduced number of generator overhauls In the drawings and specification, there have been disclosed typical embodiments of the inventive subject matter and, although specific terms are employed, they are used in a generic and descriptive sense only and not for purposes of limitation, the scope of the inventive subject matter being set forth in the following claims.

That which is claimed:

1. An island grid power supply system comprising:
at least one energy storage unit;
at least one converter coupled to the at least one energy storage unit and configured to be coupled to an island grid; and
a control circuit configured to detect a frequency variation of the island grid and to responsively cause the at least one converter to transfer power between the at least one energy storage unit and the island grid, wherein the control circuit comprises a frequency control loop configured to reduce a frequency error of the island grid and a power control loop configured to reduce a power transfer between the energy storage unit and the island grid and wherein the control circuit is configured to control a power transfer from the energy storage unit to the island grid based on a combination of outputs of the frequency control loop and the power control loop.

2. The system of claim 1, wherein the control circuit is configured to cause a power transfer between the energy storage unit and the island grid to compensate for a load response delay of at least one generator coupled to the island grid.

3. The system of claim 2, wherein the control circuit is configured to reduce a power transfer from the energy storage unit to the island grid responsive to the at least one generator delivering increased power to the grid.

4. The system of claim 1, wherein the at least one energy storage unit comprises a first energy storage unit and a second energy storage unit and wherein the control circuit is configured to selectively transfer power between the first and second energy storage units and the island grid under respective first and second load conditions.

5. The system of claim 4, wherein the first energy storage unit has a greater demand capability than the second energy storage unit and wherein the second energy storage unit has a greater energy storage capacity than the first energy storage unit.

6. The system of claim 4, wherein the at least one converter comprises first and second converters configured to couple respective ones of the first and second energy storage units to the island grid.

7. A system comprising:
   an island grid;
   at least one engine/generator set coupled to the island grid; and
   a transient frequency stabilization system comprising at least one energy storage unit and configured to detect a frequency deviation of the island grid and to responsively perform a momentary transfer of energy between the at least one energy storage unit and the island grid, wherein the transient frequency stabilization system comprises:
   at least one converter coupled to the at least one energy storage unit and configured to be coupled to the island grid; and
   a control circuit configured to detect a frequency variation of the island grid and to responsively cause the at least one converter to transfer power between the at least one energy storage unit and the island grid, wherein the control circuit comprises a frequency control loop configured to reduce a frequency error of the island grid and a power control loop configured to reduce a power transfer between the energy storage unit and the island grid and wherein the control circuit is configured to control a power transfer from the energy storage unit to the island grid based on a combination of outputs of the frequency control loop and the power control loop.

8. The system of claim 7, wherein the control circuit is configured to cause a power transfer between the energy storage unit and the island grid to compensate for a load response delay of at least one generator coupled to the island grid.

9. The system of claim 7, wherein the at least one energy storage unit comprises a first energy storage unit and a second energy storage unit and wherein the control circuit is configured to selectively transfer power between the first and second energy storage units and the island grid under respective first and second load conditions.

10. The system of claim 7, wherein the at least one engine/generator set comprises at least two engine/generator sets coupled to the grid and wherein the system further comprises a system controller configured to control the at least two engine/generator sets responsive to an availability of the transient frequency stabilization system.

11. The system of claim 7, wherein the transient frequency stabilization system is configured to support an island grid load in response to a failure of a first engine/generator set until a second engine/engine generator set assumes the island grid load.

12. The system of claim 7, wherein the at least one generator comprises a variable speed generator.

13. A system comprising:
   at least one generator coupled to an island grid;
   at least one energy storage unit;
   at least one converter coupled to the at least one energy storage unit and configured to be coupled to the island grid; and
   a control circuit configured to cause the at least one converter to transfer power between the at least one energy storage unit and the grid responsive to a change in a load on the island grid to maintain operation of the at least one generator at a predetermined operating point, wherein the at least one generator comprises a control system configured to match generator output to the load and wherein the control circuit is configured to maintain the control system of the at least one generator within a predetermined dynamic response capability limit responsive to the change in the load.

14. The system of claim 13, wherein the at least one energy storage unit comprises at least one ultracapacitor.

15. The system of claim 13, wherein the at least one generator comprises a natural gas engine and/or a diesel engine.

* * * * *